United States Patent [19]

Robbins, III

[11] Patent Number: 5,114,011

[45] Date of Patent: May 19, 1992

[54] CONTAINER ASSEMBLIES WITH ADDITIVE CUPS

[76] Inventor: Edward S. Robbins, III, 459 N. Ct., Florence, Ala. 35631

[21] Appl. No.: 598,385

[22] Filed: Oct. 18, 1990

Related U.S. Application Data

[63] Continuation-in-part of Ser. No. 576,080, Aug. 31, 1990.

[51] Int. Cl.$^5$ .................... B65D 81/32; B65D 21/02; B65D 21/08
[52] U.S. Cl. .................... 206/499; 206/219; 206/503; 206/568; 215/1 C; 215/6; 215/DIG. 8
[58] Field of Search ................... 206/219–222, 206/568, 503, 508, 509, 499; 215/1 A, 1 C, 6, 11.6, 251, DIG. 8

[56] References Cited

U.S. PATENT DOCUMENTS

| | | | |
|---|---|---|---|
| 766,587 | 8/1904 | Bradshaw | 220/8 |
| 2,487,236 | 11/1949 | Greenberg | 206/47 |
| 2,631,521 | 3/1953 | Atkins, Jr. | 99/275 |
| 2,766,796 | 10/1956 | Tupper | 150/0.5 |
| 2,824,010 | 2/1958 | Pedersen | 99/171 |
| 2,900,100 | 8/1959 | Debat et al. | 215/6 |
| 3,089,623 | 5/1963 | Padzieski | 215/6 |
| 3,220,588 | 11/1965 | Lipari | 215/11 |
| 3,378,168 | 4/1968 | Hildebrandt | 206/222 |
| 3,458,076 | 7/1969 | Babcock | 215/6 |
| 3,477,603 | 11/1969 | Koll | 215/251 |
| 3,613,955 | 10/1971 | Wetherell, Jr. | 222/83 |
| 3,802,604 | 4/1974 | Morane et al. | 222/83 |
| 3,804,952 | 4/1974 | MacDonald | 426/117 |
| 3,840,136 | 10/1974 | Lanfranconi et al. | 206/222 |
| 4,033,453 | 7/1977 | Giaimo | 206/217 |
| 4,177,938 | 12/1979 | Brina | 222/80 |
| 4,233,325 | 11/1980 | Slangan et al. | 426/107 |
| 4,264,007 | 4/1981 | Hunt | 206/219 |
| 4,456,134 | 6/1984 | Cooper | 215/1 C |
| 4,478,342 | 10/1984 | Slater | 215/251 |
| 4,627,986 | 12/1986 | Bardsley et al. | 426/112 |
| 4,634,003 | 1/1987 | Ueda et al. | 206/221 |
| 4,638,927 | 1/1987 | Morane | 222/83 |
| 4,648,532 | 3/1987 | Green | 222/82 |
| 4,667,818 | 5/1987 | Evans | 206/219 |
| 4,773,458 | 9/1988 | Touzani | 215/1 C |
| 4,775,564 | 10/1988 | Shriver et al. | 215/1 C |
| 4,776,972 | 10/1988 | Barrett | 252/90 |
| 4,798,287 | 1/1989 | Groves et al. | 206/219 |
| 4,821,875 | 4/1989 | Groves et al. | 206/219 |
| 4,873,100 | 10/1989 | Dirksing et al. | 426/111 |
| 4,875,576 | 10/1989 | Torgrimson et al. | 206/219 |
| 4,911,315 | 3/1990 | Shrum | 215/1 A |
| 4,917,237 | 4/1990 | Groves et al. | 206/219 |
| 4,927,013 | 5/1990 | Van Brunt et al. | 206/221 |

FOREIGN PATENT DOCUMENTS

| | | | |
|---|---|---|---|
| 0688612 | 6/1964 | Canada | 215/1 C |
| 2340967 | 3/1974 | Fed. Rep. of Germany | 206/508 |

Primary Examiner—Jimmy G. Foster
Attorney, Agent, or Firm—Nixon & Vanderhye

[57] ABSTRACT

Thin-walled containers are foldable and collapsible to have first and second folded portions concentrically adjacent one another in generally surrounding relationship to tapered shoulder and reduced diameter neck portions of the container. Additive cups are detachably supported within the discharge openings of the containers and, after emptying the additives into the containers through one discharge openings, are usable as dispensers of the resultant mixtures through second discharge openings.

31 Claims, 3 Drawing Sheets

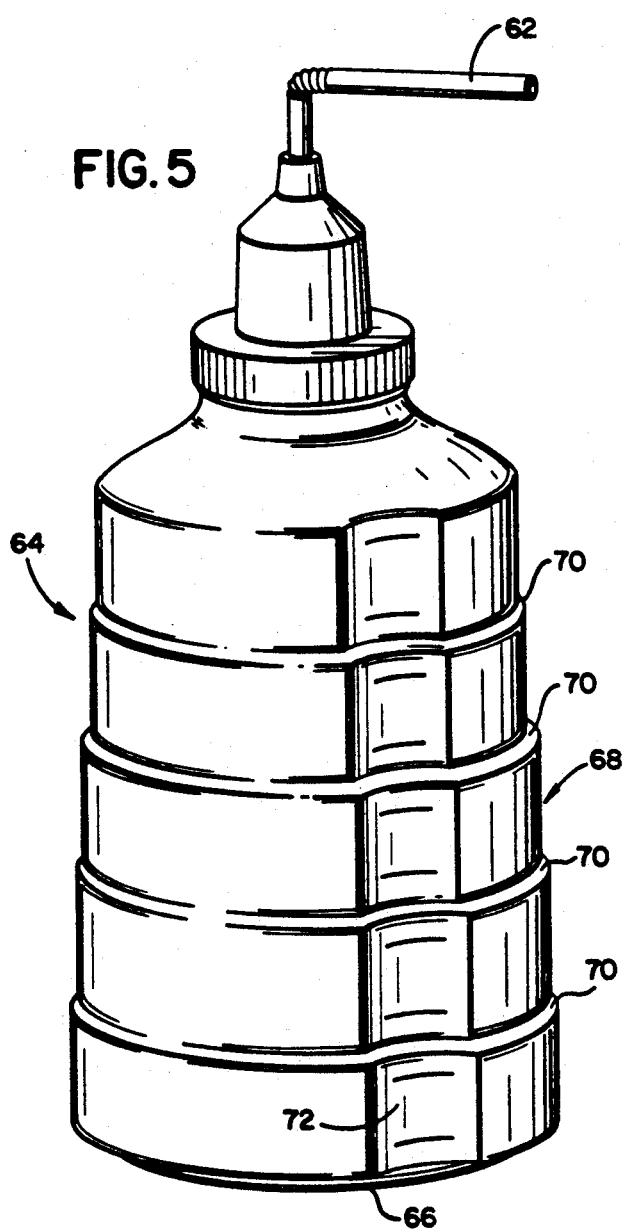
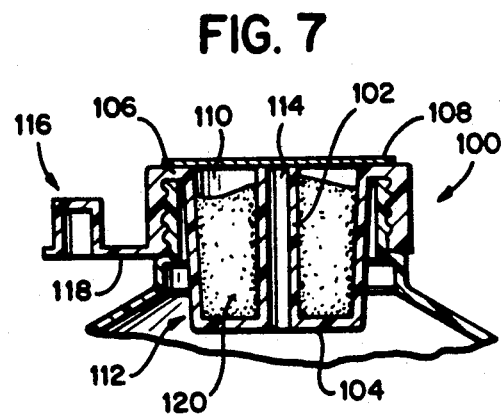
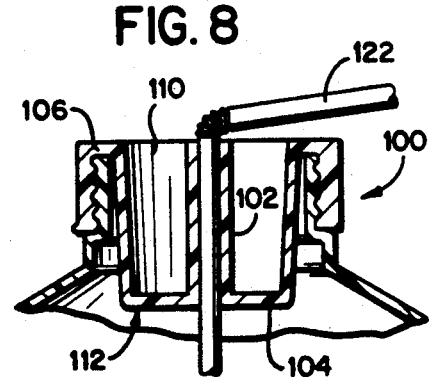
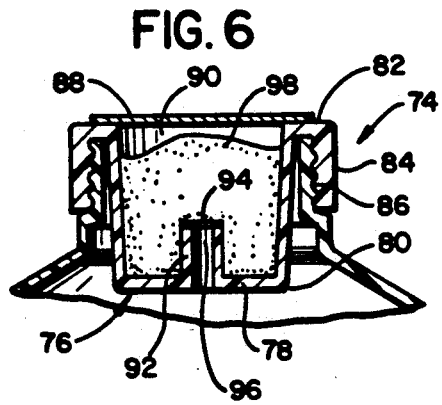
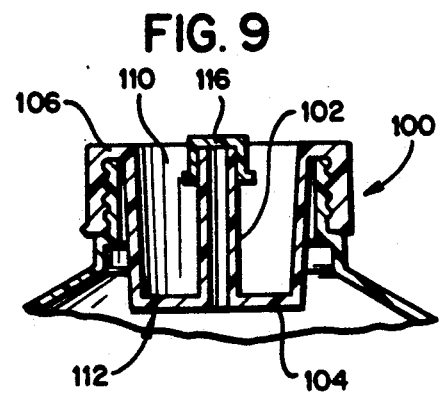

CONTAINER ASSEMBLIES WITH ADDITIVE CUPS

RELATED APPLICATIONS

This application is a continuation-in-part of my copending application Ser. No. 07/576,080 filed Aug. 31, 1990, the entire disclosure of which is expressly incorporated herein by reference.

BACKGROUND AND SUMMARY OF THE INVENTION

This invention relates generally to plastic bottle or container constructions, and particularly to thin walled bottles or containers which are collapsible and foldable, as well as to a process and apparatus for collapsing such bottles or containers. This continuation-in-part application relates specifically to containers as described above which are further provided with additive cups.

In the container industry, there are a number of known applications for relatively thin, flexible bottles or containers, some of the more well known of which relate to the shipment and retail sale of beverages such as milk, water, juice, etc., as well as liquid or powdered cleaners, detergents and the like. There are also a variety of applications where separate ingredients or contents are provided which are to be mixed by the user.

It is often the case that such containers must be shipped over considerable distances to distributors who fill and then ship the filled containers to retail concerns. During the initial shipment to distributors, the empty containers, for example one gallon containers, take up so much space that, from a volume standpoint, the manufacturer is shipping mostly air.

At the same time, there is great concern in the environmental arena for plastic materials which for the most part, are not reusable or recyclable, and which therefore pose significant disposal problems, particularly in light of the ever expanding utilization of plastics in virtually every area of technology. The problem is especially acute in the container industry. There is now, as a result, a national environmental issue of source reduction, i.e., how to reduce the amount of plastics utilized in the production of various products.

This invention seeks to alleviate both of the above described concerns by:

1) providing a plastic bottle or container construction which requires approximately one half of the plastic currently used in most plastic containers, particularly those which typically carry milk, water, juice, detergents (liquid or powder) and other liquids and/or particulates; and 2) shaping the containers in such a way as to facilitate collapse and folding to a compact size which results in a two or more to one increase in shipping capacity.

For purposes of this invention, the term "container" refers to plastic containers or bottles having shapes as disclosed herein. In accordance with a preferred embodiment of the invention, a thin walled plastic container is manufactured by an extrusion or injection blow molding process, incorporating a thin walled construction which permits the normally self-supporting container to be collapsed and a portion or portions concentrically folded to provide a compact, nestable and/or stackable container for efficient shipment.

The container side wall in a preferred embodiment is provided with peripheral, vertically spaced steps or shoulders which facilitate axial collapse and subsequent concentric folding of portions of the side wall to provide a collapsed and folded container article with at least two adjacent, folded "layers" of side wall in generally surrounding relationship to tapered shoulder and narrow neck portions of the container.

The container side wall may also be formed originally with one or more steps, or with a smooth, tapered or even straight peripheral side wall and nevertheless collapsed and folded as will be explained further herein.

A plurality of containers collapsed and folded in the manner described above may be arranged in the form of a stack and packaged for easy and efficient shipment.

In this continuation-in-part application, containers as described above are provided with additive cups supported within the discharge opening in the upper portion of the container. Such additive cups may be utilized to hold concentrate powders, liquids, or other ingredients (referred to herein generically as "additives") which are to be poured from a first dispensing portion of the cup into the container for mixing with the contents of the container by the user. It is a significant feature of this invention, that the cup is provided with a second dispensing portion for dispensing the mixture of the container contents and additive upon pouring the additive into the container. In one exemplary embodiment, the cup is inverted after pouring the additive into the container and reattached thereto in order to serve as a dispenser of the mixture. In this exemplary embodiment, a replaceable screw cap with a removable panel therein is utilized to hold the cup in place within the discharge opening of the container, and to hold the cup in an inverted position on the container in its function as a dispenser for the mixture.

In another embodiment, a cup is provided which is integrally formed with a screw-type cap, and which includes a removable seal across the upper open end of the cup. After the seal is removed and the additive emptied into the container, the cup may be reattached to the container in its original orientation. In this embodiment, the bottom portion of the additive cup is provided with a closable aperture designed especially to receive a straw or the like in order to facilitate dispensing of the mixture.

Variations of this second embodiment of the invention are also disclosed specifically relating to the construction of the second dispensing portion of the cup, and to a replaceable cap structure for the mixture dispensing portion of the cup.

It will be appreciated, of course, that the containers of this invention may be of the thin wall collapsible type as disclosed in the parent application, and included all the advantageous features thereof including stackability, and the like. It should be understood however, that the cup construction per se may be utilized with any of a wide variety of containers.

Thus, in accordance with the broader aspects of the invention, a container assembly is provided which comprises: a main container body including a bottom wall, peripheral side wall and an open upper end adapted to receive a closure; a cup detachably supported in the open upper end and adapted to hold an additive for mixing with contents of the main container body, the cup having a first dispensing portion for pouring the additive into the main container body, and a second dispensing portion for dispensing a mixture of the contents and the additive.

In another aspect, the invention relates to a collapsed thin wall container for facilitating compact shipment of a plurality of such containers comprising a bottom wall, a peripheral side wall extending from the bottom wall, a tapered shoulder section extending from the peripheral side wall, and a reduced diameter neck portion including an opening extending from the tapered shoulder section, and the peripheral side wall including at least one portion folded outwardly and upwardly to form a first concentric folded portion extending upwardly at least to the tapered shoulder section; a cup detachably supported in the opening and adapted to hold an additive for mixing with contents of the container, the cup having a first dispensing portion for pouring the additive into the container, and a second dispensing portion for dispensing a mixture of the contents and the additive.

In still another aspect, the invention relates to a stack of collapsed and folded containers, each of which comprises a bottom wall, a peripheral side wall extending the said bottom wall, a tapered shoulder section extending from the peripheral side wall, and a reduced diameter neck portion including an opening extending from the tapered shoulder section, the peripheral side wall including at least one portion folded outwardly and upwardly to form a first concentric folded portion extending upwardly to at least the tapered shoulder section; a cup detachably supported in the opening and adapted to hold an additive for mixing with contents of the container, the cup having a first dispensing portion for pouring the additive into the container, and a second dispensing portion for dispensing a mixture of the contents and the additive.

Other objects and advantages of the invention will become apparent from the detailed description which follows.

BRIEF DESCRIPTION OF THE DRAWINGS

FIG. 5 is a perspective view of a container in accordance with a second exemplary embodiment of the invention;

FIG. 6 is a partial cross sectional view of the upper portion of a container in accordance with a third exemplary embodiment of the invention;

FIG. 7 is a partial cross sectional view of an upper portion of a container in accordance with a fourth embodiment of the invention;

FIG. 8 is a partial cross sectional view of the container portion as illustrated in FIG. 7 but after a seal and cup additive have been removed and a drinking straw inserted; and FIG. 9 is a partial cross sectional view of an upper container portion as illustrated in FIG. 8 but with the straw removed and a removable cap of the type shown in FIG. 7 applied over the dispensing aperture thereof.

DETAILED DESCRIPTION OF THE DRAWINGS

Figure 1:
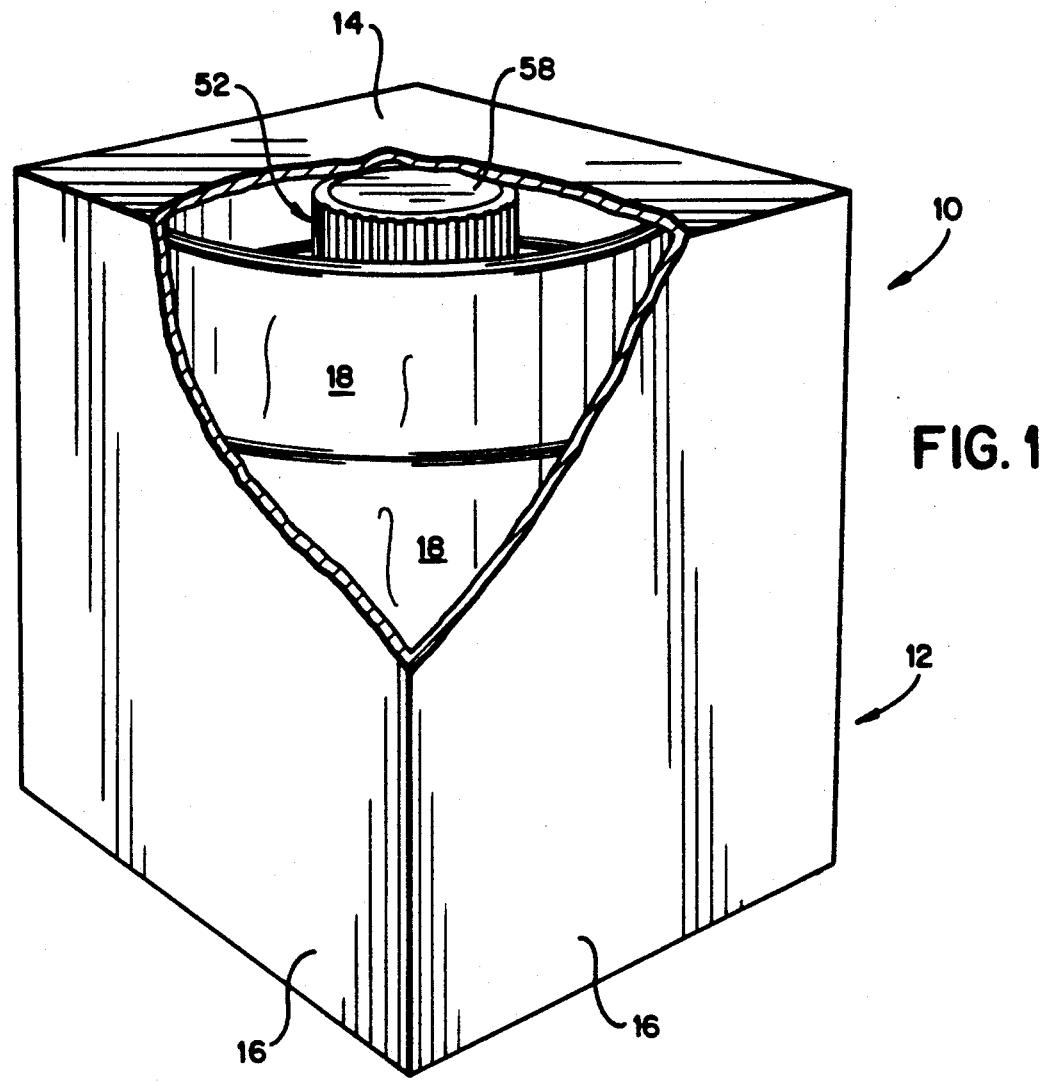
FIG. 1 is a perspective view, partially cut away, illustrating a first embodiment of the invention, shown in packaged form.

Referring now to FIG. 1, a package or box 10 is shown enclosing a plurality of folded and collapsed containers 18 constructed in accordance with a first exemplary embodiment of the invention. The package or box 10 is shown to be of square configuration (other configurations may also be employed) and includes a bottom wall (not shown), a top wall 14 and four identical side walls 16. The package or container 10 can be constructed of any conventional material, such as cardboard, paperboard, plastic film wrap, and the like.

Figure 2:
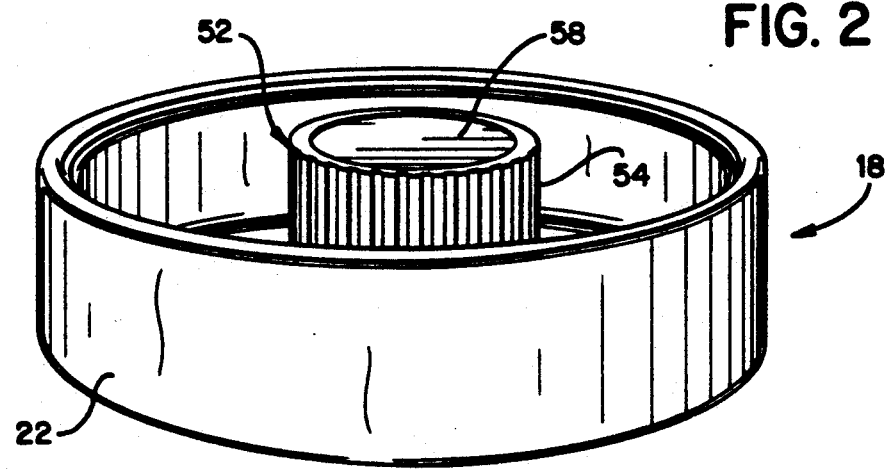
FIG. 2 is a perspective view of a collapsed and folded container of the type shown packaged in FIG. 1.

The folded and collapsed containers 18 each have the folded and collapsed configuration illustrated in FIG. 2, and are placed one atop the other to form a stack which is easily packaged in a container such as that shown at 10.

It will be appreciated that the general configuration of the containers 18, including preferred materials, wall thicknesses, etc. and the manner in which such containers may be collapsed and folded to the configuration shown in FIG. 2 is substantially as shown and described in the above identified parent application, hereafter referred to as "the parent application".

Figure 3:
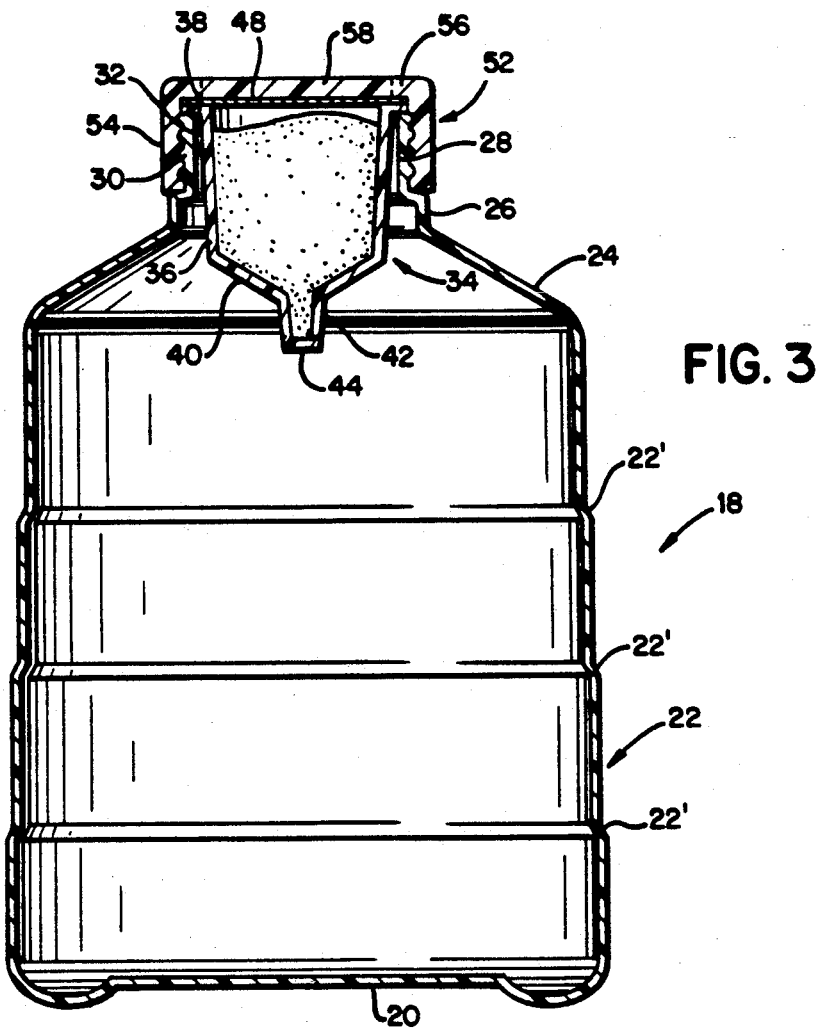
FIG. 3 is a side section view of a container of the type illustrated in FIG. 2 but expanded to its normal upright position.
Figure 4:
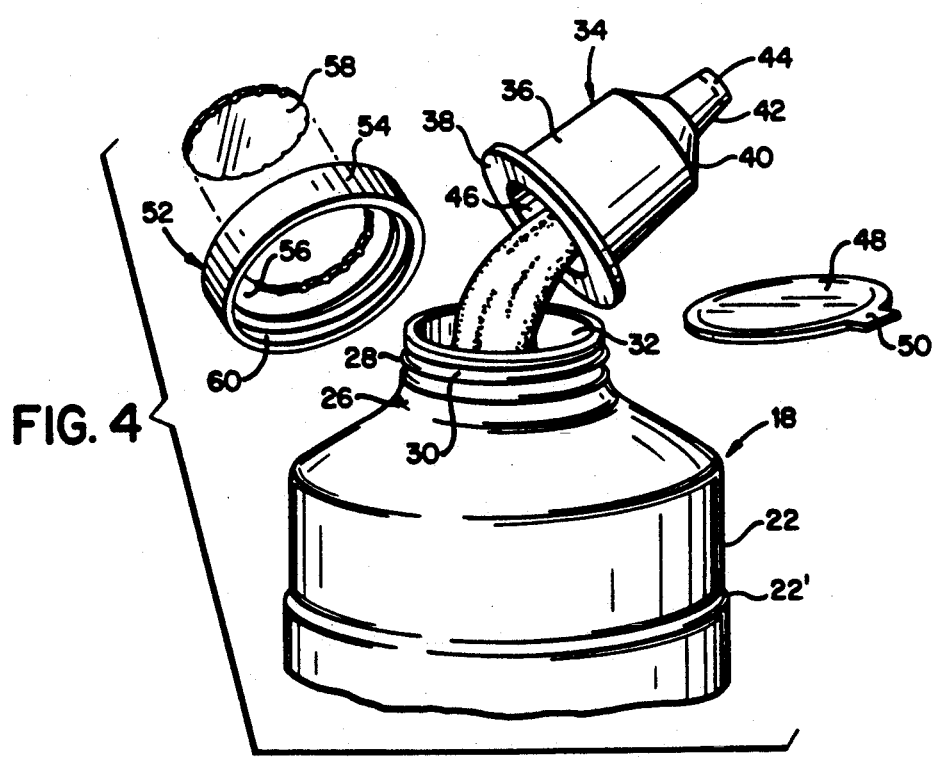
FIG. 4 is a partial exploded perspective view illustrating the cap structure of the container illustrated in FIG. 3, and a preferred manner of use thereof.

With reference now to FIG. 3, the container 18 is shown in its normal uncollapsed and upright condition. The container 18 has a unitary plastic body including a bottom wall 20, a tapered peripheral side wall 22 having a plurality of annular shoulders or steps 22' a shoulder section 24, which could be tapered as shown in FIG. 3, or flat or any other suitable configuration, and a narrow neck portion 26 which includes an upstanding discharge portion 28 provided with a series of external threads 30. The upstanding discharge portion 28 defines a discharge opening 32 as best seen in FIG. 4.

A cup 34, constructed of plastic or other suitable material, is shown supported on the uppermost edge of the container 18, surrounding the opening 32. The cup 34 has a peripheral side wall 36, an upper, radially outwardly flange 38, a lower tapered portion 40 and a lower discharge portion 42 closed by an integral but removable bottom wall 44. The cup 34 is substantially hollow and includes an opening 46 defined by an interior annular surface of the flange portion 38.

With reference especially to FIG. 3, it may be seen that the cup 34 is intended to hold an additive material 35 (such as powdered concentrate or the like) to be mixed with the contents (not shown) of container 18, and is sealed about the opening 46 by a flat, flexible foil or other suitable seal 48 which may be adhesively secured in a conventional manner to the flange 38. The seal 48 is provided with a finger gripping portion 50 to enable the seal to be torn or peeled away from the flange 38 and cup opening 46.

A cap 52, having a peripheral side wall 54 and a top wall 56, including a punch-out panel portion 58, may be applied to the container 18 by means of screw threads 60 on the interior surface of the peripheral side wall 54, which threads are adapted to engage the exterior screw threads 30 provided on the upstanding discharge portion 28 of the container 18. Thus, the cap 52 serve to hold the cup 34 in the position as shown in FIG. 3 until the container 18 is ready for use. At that time, the screw cap 52 is removed and the cup 34 may then be lifted out of the container 18. The seal 48 is then removed from the cup 34 and the additive poured into the container 18 as illustrated in FIG. 4 for mixture with the container contents.

Once the additive 35 has been mixed with the contents of the container 18, the cup 34 may be inverted so that the opposite side of the flange 38 now rests on the uppermost edge of the upstanding dispensing portion 18. The punch-out portion or panel 58 of the cap 52 is then removed and the cap is reapplied to the container with the major portion of the cup extending upwardly through the hole in the cap 52 as best seen in FIG. 5. By thereafter severing the closed lower end portion 44 to provide a second dispensing opening in portion 42 at the opposite end of the cup from opening 46 (but concentric therewith), the cup 34 has now been reconfigured as a narrow neck dispensing structure and, as shown for example in FIG. 5, a straw 62 may be inserted within the opening for use in a conventional manner. In an alternative arrangement, the user may discharge the contents of the container directly from the opening in portion 42 of cup 34 without the additional use of a straw.

Referring back to FIGS. 1 and 2, it will be appreciated that the cup 34 (and cups as described below in additional embodiments) are left undisturbed during the collapsing and folding of the container 18 and during stacking, packaging and shipping.

The container 64 illustrated in FIG. 5 is similar to that illustrated in FIG. 3, the principal differences relating to the number of annular steps or shoulders 68, provided in the peripheral side wall 70, and the provision of an axial shallow groove or recess 72 to facilitate gripping of the container by the user.

With reference now to FIG. 6, an alternative embodiment of the concentrate cup is disclosed which may be used with containers 18 or 64. The cup 74 is formed integrally with the screw-on cap so that the cup is useful only in a single orientation relative to the container as shown in FIG. 6. Thus, the cup 74 includes a cup portion 76 having a bottom wall 78, an annular peripheral side wall 80, an outwardly extending top wall or flange 82, and an annular depending skirt portion 84. The latter is provided with screw threads 86 on the interior surface thereof for engagement with complimentary threads on the narrow neck portion of the associated container (such as threads 28 of container 18). An adhesively secured, removable seal 88 closes the opening 90.

The cup portion itself is provided on bottom wall 78 with a hollow, upstanding projection 92, extending upwardly and concentrically relative to side wall 80, and sealed at its upper open end by a removable seal element 94. In this way, the additive 98 is sealed within the cup 74.

In use, the cup 74 may be removed from the container, the upper seal 88 removed. The additive 98 may then be poured into the container. The cup may then be re-attached to the container. Thereafter, the seal 94 over the opening 96 may be removed and a straw inserted therein for easy dispensing of the contents of the container.

In another exemplary embodiment, illustrated in FIG. 7, a cup 100 is similar to cup 74 with the exception that a hollow upstanding projection 102 formed in the bottom wall 104 extends the full height of the cup, terminating flush with a top wall or radial flange 106. Thus, a single, removable seal 108 can be employed to seal opening 110 in the cup portion 112, and opening 114 in the projection 102. A further distinction relates to the incorporation of an integral cap 116 which is integrally attached to the cup 100 by a thin, breakable web 118.

In use, after cup 100 has been removed from the container, and after the seal 108 has been removed from the cup 100, the additive 120 may be poured into the container for mixing with the contents thereof. Cup 100 can then be replaced and straw 122 inserted in opening 114 for convenient dispensing of the container contents (see FIG. 8). If some contents remain, the removable cap 116 may then be removed from cup 100 and inserted over the opening 114 to reseal the same as best shown in FIG. 9.

It will thus be seen that the above described invention provides a simple, low cost and easy-to-use container assembly which allows additives such as concentrates and the like to be incorporated into the container into which they are to be mixed, and which at the same time, enables the use of the concentrate cup as a dispenser for the container mixture.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container assembly comprising:
 a main container body including a bottom wall, peripheral side wall, an open upper end and a first cap removably securable to said open upper end of said container body;
 a cup detachably supported in said open upper end and adapted to hold an additive for mixing with contents of said main container body, said cup having a first dispensing portion for pouring said additive into said main container body, and a second dispensing portion dispensing a mixture of said contents and said additive, wherein said first and second dispensing portions are concentrically arranged and wherein at least said first dispensing portion is closed prior to use by a removable seal accessible from outside said main container body when said first cap is in place on said container body.

2. A container assembly as defined in claim 1 wherein said first and second dispensing portions are closed prior to use by a common, removable seal.

3. A container assembly as defined in claim 1 wherein said second dispensing portion lies intermediate upper and lower ends of the cup.

4. A container assembly as defined in claim 3 wherein said first and second dispensing portions are closed prior to use by separate, removable seals.

5. A container assembly according to claim 1 wherein a second cap is provided for closure of said second dispensing portion after an initial use of the container assembly.

6. A container assembly according to claim 1 wherein said second dispensing portion is sized to receive a drinking straw.

7. A container assembly according to claim 1 wherein said cup is integral with said first cap.

8. A container assembly according to claim 1 wherein said main container body is provided with a plurality of vertically spaced annular steps formed in said peripheral side wall, said steps adapted to permit said main container body to be collapsed and folded to a compact configuration wherein a pair of concentric, folded peripheral side wall portions lie radially adjacent each other and adjacent said cup.

9. A stack of collapsed and folded containers, each of which comprises a bottom wall, a peripheral side wall extending from said bottom wall, a tapered shoulder section extending from said peripheral side wall, and a reduced diameter neck portion including an opening extending from said tapered shoulder section, said peripheral side wall including at least one portion folded outwardly and upwardly to form a first concentric folded portion extending upwardly to at least said tapered shoulder section;

a cup detachable supported in said opening and adapted to hold an additive for mixing with contents of said container, said cup having a first dispensing portion for pouring said additive into said container, and a second dispensing portion for dispensing a mixture of said contents and said additive.

10. The stack according to claim 9 wherein said peripheral side wall is formed with an annular step defining a fold line for said first folded portion.

11. The stack according to claim 10 wherein said first and second folded portions of each container have uppermost edges which lie in substantial lateral alignment with said cup.

12. The stack according to claim 9 wherein said peripheral side wall includes a second folded portion lying concentrically adjacent said first portion.

13. The stack according to claim 9 and including a package enclosing said stack.

14. A collapsed thin wall container for facilitating compact shipment of a plurality of such containers comprising a bottom wall, a peripheral side wall extending from said bottom wall, a shoulder section extending from said peripheral side wall, and a reduced diameter neck portion including an opening extending from said shoulder section, and said peripheral side wall including at least one portion folded outwardly and upwardly to form a first concentric folded portion extending upwardly at least, to said shoulder section;

a cup detachably supported in said opening and adapted to hold an additive for mixing with contents of said container, said cup having a first dispensing portion for pouring said additive into said container, and a second dispensing portion for dispensing a mixture of said contents and said additive.

15. The container according to claim 14 wherein said peripheral side wall is formed with an annular step defining a fold line for said first concentric folded portion.

16. The container according to claim 14 wherein said peripheral side wall includes a second folded portion lying concentrically adjacent said first folded portion.

17. A container assembly comprising:

a main container body including a bottom wall, a collapsible peripheral side wall, and an upper portion surrounding an opening, said main container body adapted to hold a first material;

a cup having first and second ends, at least one of said first and second ends being temporarily closed by a removable seal, said cup being detachably supported within said opening and said other of said first and second ends located within said main container body; said cup adapted to hold an additive mixable with said first material upon removal of said cup and said removable seal; said cup further having a separate dispensing portion adapted to dispense a mixture of said additive and said first material from said main container body portion upon reattachment of said cup to said main container body, wherein prior to mixing, said cup is supported within said opening in a first position and, after mixing, said cup is supported in said opening in a second position inverted relative to said first position.

18. The container assembly of claim 17 wherein said other end of said cup includes a tapered shoulder portion and a narrow neck terminating in said dispensing portion.

19. The container assembly of claim 18 wherein said narrow neck portion is adapted to be severed to provide an opening in said dispensing portion.

20. The container assembly of claim 19 and further comprising a straw insertable within said opening in said dispensing portion.

21. The container assembly according to claim 17 and including a screw cap adapted to attach said cup to said main container body in either of said first or second positions.

22. The container assembly of claim 17 wherein said removable seal comprises a foil provided with adhesive about at least a peripheral edge of one side thereof.

23. The container assembly of claim 17 wherein said dispensing portion extends away from said removable seal.

24. A container assembly comprising:

a main container body including a bottom wall, peripheral side wall and an open upper end, said open upper end having a removable cap attached thereto;

a cup detachably supported in said open upper end and held in place by said removable cap, and adapted to hold an additive for mixing with contents of said main container body, said cup having a first dispensing portion for pouring said additive into said main container body, and a second dispensing portion for dispensing a mixture of said contents and said additive, wherein said removable cap is provided with a removable panel to permit said removable cap to detachably support said cup in both upright and inverted orientations.

25. A container assembly as defined in claim 24 wherein said first and second dispensing portions are located at opposite ends of said cup.

26. A container assembly as defined in claim 25 wherein said second dispensing portion is closed prior to use by an integral end portion adapted to be severed from said cup.

27. A container assembly according to claim 24 wherein said second dispensing portion is sized to receive a drinking straw.

28. A container assembly according to claim 24 wherein said main container body is provided with a plurality of vertically spaced annular steps formed in said peripheral side wall, said steps adapted to permit said main container body to be collapsed and folded to a compact configuration wherein a pair of concentric, folded peripheral side wall portions lie radially adjacent each other and adjacent said cup.

29. A collapsed thin wall container for facilitating compact shipment of a plurality of such containers comprising a bottom wall, a peripheral side wall extending from said bottom wall, and an upper end having a discharge opening, a shoulder section extending from said peripheral side wall, said peripheral side wall including first and second folded portions outwardly and upwardly to form first and second concentric folded portions extending upwardly at least to said shoulder section;

a cup detachably supported in said discharge opening and adapted to hold an additive for mixing with contents of said container, said cup having a first dispensing portion for pouring said additive into said container, and a second dispensing portion for dispensing a mixture of said contents and said additive, wherein said first and second folded portions have uppermost edges which lie in substantial lateral alignment with said cup.

30. A container assembly comprising:

a main container body including a bottom wall, a collapsible peripheral side wall, and an upper portion surrounding an opening, said main container body adapted to hold a first material;

a cup having first and second ends, at least one of said ends being temporarily closed by a removable seal, said cup being detachably supported within said opening with said removable seal located exteriorly of said main container body, and said other end located within said main container body; said cup adapted to hold an additive mixable with said first material upon removal of said cup and said removable seal; said cup further having a separate dispensing portion adapted to dispense a mixture of said additive and said first material from said main container body portion upon reattachment of said cup to said main container body, wherein said dispensing portion extends toward said removable seal, and wherein said dispensing portion is closed by a second removable seal.

31. The container assembly to claim 30 and further including a cap for use with said dispensing portion upon removal of said second removable seal.

* * * * *